(12) United States Patent
Feng (10) Patent No.: US 8,103,236 B2
(45) Date of Patent: Jan. 24, 2012

(54) METHOD AND APPARATUS FOR PROCESSING SIGNAL

(75) Inventor: Shen Feng, San Diego, CA (US)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 269 days.

(21) Appl. No.: 12/651,989

(22) Filed: Jan. 4, 2010

(65) Prior Publication Data

US 2011/0065406 A1   Mar. 17, 2011

(30) Foreign Application Priority Data

Sep. 11, 2009   (CN) .......................... 2009 1 0195503

(51) Int. Cl.
*H04Q 7/00* (2006.01)
(52) U.S. Cl. .................. 455/313; 455/296; 455/334
(58) Field of Classification Search .... 455/226.1–226.3, 455/255–260, 296, 303, 304, 313, 318, 319, 455/323, 324, 333, 334
See application file for complete search history.

(56) References Cited

U.S. PATENT DOCUMENTS

| 7,203,466 | B2 * | 4/2007 | Muschallik et al. | 455/86 |
| 7,299,021 | B2 * | 11/2007 | Pärssinen et al. | 455/226.1 |
| 7,317,930 | B2 * | 1/2008 | Ikeda | 455/500 |
| 7,480,495 | B2 * | 1/2009 | Matsushima et al. | 455/130 |
| 7,702,371 | B2 * | 4/2010 | Edwards et al. | 455/574 |
| 8,064,824 | B2 * | 11/2011 | Karabinis | 455/13.4 |

* cited by examiner

*Primary Examiner* — Nhan Le
(74) *Attorney, Agent, or Firm* — Jun He Law Offices P.C.; James Zhu

(57) ABSTRACT

A signal processing method and system are provided. The method includes receiving an input signal within a first frequency range, the input signal including a desired signal and an interference signal. The method includes down-converting the input signal to a second frequency range, which is lower than the first frequency range, using an offset local oscillator signal having a frequency substantially equal to the central frequency of the desired signal. The method includes separating the interference signal from the down-converted input signal. The method includes up-converting the separated interference signal to the first frequency range. The method includes subtracting the up-converted interference signal from the input signal at the first frequency range to obtain an interference removed signal. The method includes down-converting the interference removed signal to a third frequency range, which is lower than the first frequency range, using a local oscillator signal, for demodulating. The frequency of the offset local oscillator signal is different from the frequency of the local oscillator signal.

20 Claims, 9 Drawing Sheets

METHOD AND APPARATUS FOR PROCESSING SIGNAL

PRIORITY CLAIM

This application claims the benefit of Chinese patent application number 200910195503.8, filed Sep. 11, 2009, which is incorporated herein by reference in its entirety.

BACKGROUND

In today's RF systems, signals received by antennas usually have high frequencies and narrow channel bandwidths. To filter out a desired channel directly, a high Q filter is required. For reasons regarding gain, precision, stability, and power consumption etc. of circuits for processing high frequency signals, it is not practical to demodulate a signal at a high frequency range directly. In a commonly used approach, a signal is first down-converted to an intermediate frequency (IF) range. The down-converted signal is then filtered, amplified, and demodulated to filter out the desired channel, but other problems are introduced.

In a low IF method, there may be image frequency interference. If a desired signal's frequency and an interference signal's frequency are symmetrical about a local oscillator signal's frequency, the desired signal and the interference signal will be down-converted to the same intermediate frequency. The interference signal is an image frequency interference of the desired signal.

A zero IF method solves the problem of image frequency interference. However, there may be problems of DC offset, 1/f noise, and signal leakage, etc.

Hooman Darabi proposed a SAW-less method for filtering a blocker signal ("A Blocker Filtering Technique for SAW-Less Wireless Receivers", IEEE JSSC, Vol. 42, No. 12, December 2007, pp. 2766-2773). In this method, a received signal is down-converted, and then a blocker signal is separated from the down-converted signal. After that, the blocker signal is up-converted, and the up-converted blocker signal is subtracted from the received signal to obtain a desired signal. In this method, the main signal path and the translational path share the same local oscillator signal in the down-conversions. Although the method solves the problem of blocker signal partly, other problems arise. Therefore, it is necessary to provide a new method and a new apparatus to solve the problems mentioned above.

SUMMARY

In one aspect, the present application is related to a signal processing method, especially a signal processing method in which the separation of interference signal(s) uses the zero IF method and the down-conversion of the interference removed signal uses the non-zero IF method.

In another aspect, the present application is related to a receiver, especially a receiver in which the translational path uses the zero IF method and the main signal path uses the non-zero IF method.

In one aspect of the present application, a signal processing method is provided. The method includes the following operations: receiving an input signal within a first frequency range, the input signal including a desired signal and an interference signal; down-converting the input signal to a second frequency range, which is lower than the first frequency range, using an offset local oscillator signal having a frequency substantially equal to the central frequency of the desired signal; separating the interference signal from the desired signal; up-converting the separated interference signal to the first frequency range; subtracting the up-converted interference signal from the input signal to obtain the desired signal; and down-converting the desired signal to a third frequency range, which is lower than the first frequency range, using a local oscillator signal, for demodulating. Where, the frequency of the offset local oscillator signal is different from the frequency of the local oscillator signal.

In one embodiment, the first frequency range may be an RF frequency range, and the second frequency and the third frequency range may be IF frequency ranges.

In one embodiment, the interference signal may be from an adjacent channel of the desired signal. The interference signal may be any interference signal having a frequency close to the desired signal.

In one embodiment, the signal processing method may further include the following operations: phase shifting the up-converted interference signal by 180 degrees; and adding the phase shifted interference signal to the input signal at the first frequency range to obtain the desired signal at the first frequency range.

The term RF (also known as radio frequency) may refer to any wireless or cable transmitted signal frequency range, and is not limited to a specific frequency band or range. Rather, for mobile communication applications, RF signals may be signals received at 1.9 GHz range, 1.85 GHz range, 950 MHz range, 880 MHz range etc. For frequency modulation (FM) applications, RF signals may be signals received at 100 MHz range etc. For digital TV applications, RF signals may be signals received at 600 MHz range etc. For two-way radio applications, RF signals may be signals received at 410 MHz range etc. RF signals may be signals received at other wireless or cable transmission frequency ranges, etc. The term IF (or intermediate frequency) may refer to a frequency range, which may be variable, and that is typically lower than RF. Circuits within a receiver typically down-convert or translate received signals from an RF frequency to an IF frequency to perform some types of processing in some cases. In some cases, an IF frequency range may include frequencies relatively close to zero Hz (as compared to RF), such as 1 KHz, 12.5 KHz, 20 KHz, 100 KHz, 200 KHz, 500 KHz, 900 KHz, 4 MHz, and 36 MHz etc., or other appropriate IF frequency.

In another aspect of the present application, a signal processing method is provided. The method comprises the following operations: receiving an input signal within a first frequency range, the input signal including a desired signal and an interference signal; down-converting the input signal to a second frequency range, which lower than the first frequency range, using a zero IF method; separating the interference signal from the desired signal; up-converting the separated interference signal to the first frequency range; subtracting the up-converted interference signal from the input signal to obtain the desired signal; and down-converting the desired signal to a third frequency range, which is lower than the first frequency range, using a non-zero IF method, for demodulating.

In one embodiment, the first frequency range may be an RF frequency range, and the second frequency and the third frequency range are IF frequency ranges.

In one embodiment, the interference signal may be an interference signal from an adjacent channel of the desired signal.

In one embodiment, the signal processing method may further comprise the following operations: phase shifting the up-converted interference signal by 180 degrees; and adding the phase shifted interference signal to the input signal at the first frequency range to obtain the desired signal at the first frequency range.

In one embodiment, the non-zero IF method is selected from a group comprised of low IF method and high IF method.

In another aspect of the present application, a receiver is provided. The receiver comprises: a first mixing circuit for down-converting an input signal within a first frequency range to a second frequency, which is lower than the first frequency range, using a zero IF method, the input signal including a desired signal and an interference signal; a filter for separating the interference signal from the down-converted input signal; a second mixing circuit for up-converting the separated interference signal to the first frequency range; a subtracting circuit for subtracting the up-converted interference signal from the input signal to obtain the desired signal; and a third mixing circuit for down-converting the desired signal to a third frequency range, which is lower than the first frequency range, using a non-zero IF method, for demodulating.

In one embodiment, the filter may be a high pass filter.

In one embodiment, the first frequency range may be an RF frequency range, and the second frequency and the third frequency range are IF frequency ranges.

In one embodiment, the interference signal may be an interference signal from an adjacent channel of the desired signal.

In one embodiment, the first mixing circuit may comprise a first pair of quadrature mixers, and the second mixing circuit may comprise a second pair of quadrature mixers, and the third mixing circuit may comprise a third pair of quadrature mixers.

In one embodiment, the non-zero IF method is selected from a group comprised of low IF method and high IF method.

BRIEF DESCRIPTION OF THE DRAWINGS

The accompanying drawings are included to provide a further understanding of the present application and are incorporated in and constitute a part of this specification. The drawings illustrate the embodiments of the present application and together with the description serve to explain the principles of the application. Other embodiments of the present application and many of the intended advantages of the present application will be readily appreciated, as they become better understood by reference to the following detailed description. The elements of the drawings are not necessarily to scale relative to each other. Like reference numerals designate corresponding similar parts.

DETAILED DESCRIPTION OF ILLUSTRATED EMBODIMENTS

In the following detailed description, reference is made to various specific embodiments of the invention. These embodiments are described with sufficient detail to enable those skilled in the art to practice the application. It is to be understood that other embodiments may be employed, and that various structural, logical and electrical changes may be made without departing from the spirit or scope of the application.

If a non-zero IF method is used, the approach proposed by Hooman Darabi may be unable to remove or attenuate interference signals from channels adjacent to that of a desired signal, and the approach may even introduce additional interference signals. The below detailed description discusses the above mentioned drawbacks of the approach proposed by Hooman Darabi. The non-zero IF method may be any down-conversion method in which the local oscillator signal has a frequency not equal to the central frequency of the desired signal.

Figure 1A:
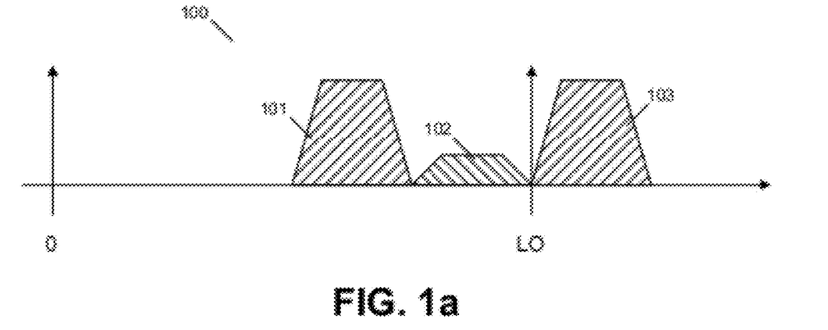
FIG. 1a illustrates a spectrum graph of an input signal in one example.

FIG. 1a illustrates a spectrum graph of input signal 100. In the spectrum graph, the horizontal axis represents frequency, and the vertical axis represents energy. Input signal 100 includes interference signal 101, desired signal 102 having a frequency band higher than that of interference signal 101, and interference signal 103 having a frequency band higher than that of desired signal 102. Interference signal 101, desired signal 102, and interference signal 103 have a same frequency band width. Interference signals 101 and 103 may be interference signals from channels adjacent to the channel of desired signal 102. Assuming the main path uses the low IF method, and the local oscillator signal used has a frequency about which the frequency bands of desired signal 102 and interference signal 103 are symmetrical, as illustrated in FIG. 1a. Since the translational path shares the same local oscillator signal with the main path, input signal 100 is down-converted using the local oscillator signal.

Either single side band mode or double side band mode may be used to separate interference signals. To operate in single side band mode, the mixing circuits in translational path may be single side band mixing circuits. To operate in double side band mode, the mixing circuits in the translational path may be double side band mixing circuits. When single side band mode is used, the input signal may be down-converted to two quadrature components i.e. in-phase component and quadrature component, high pass filtered, and then up-converted to a single channel signal, in the translational path. When double side band mode is used, the input signal may be processed in a single channel all the way in the translational path. In some cases, double side band mode has cost advantages, and single side band mode has performance advantages.

Figure 1B:
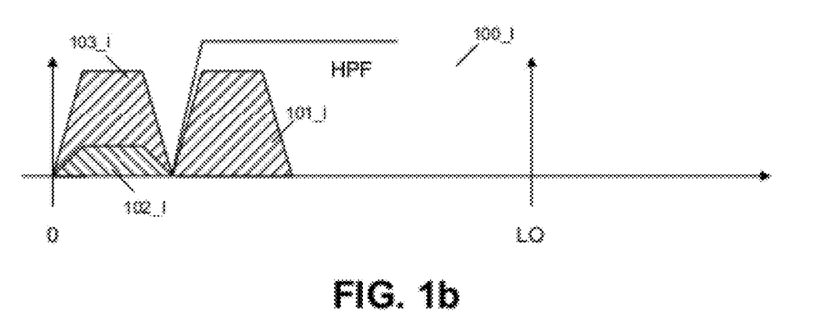
FIG. 1b illustrates a spectrum graph of an in-phase component of the input signal down-converted using a low IF method.

FIG. 1b illustrates a spectrum graph of in-phase component 100_I of input signal 100 down-converted using the low IF method. In-phase component 100_I includes in-phase component 101_I of interference signal 101, in-phase component 102_I of desired signal 102, and in-phase component of interference signal 103. Since frequency bands of desired signal 102 and interference signal 103 are symmetrical about the frequency of local oscillator signal, in-phase component 102_I and in-phase component 103_I have the same frequency band. In other words, interference signal 103 is an image interference of desired signal 102. In-phase component 101_I has a frequency band higher than that of in-phase components 102_I and 103_I. In-phase component 101_I may be separated by high pass filter, but in-phase component 103_I can not be separated for having the same frequency band with in-phase component 102I.

Figure 1C:
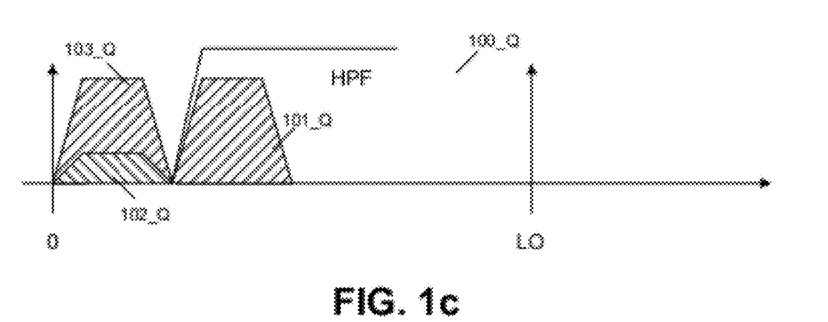
FIG. 1c illustrates a spectrum graph of a quadrature component of the input signal down-converted using the low IF method.

FIG. 1c illustrates a spectrum graph of quadrature component 100_Q of input signal 100 down-converted using the low IF method. Quadrature component 100_Q includes quadrature component 101_Q of interference signal 101, quadrature component 102_Q of desired signal 102, and quadrature component of interference signal 103. Since frequency bands of desired signal 102 and interference signal 103 are symmetrical about the frequency of local oscillator signal, quadrature component 102_Q and quadrature component 103_Q have the same frequency band. In other words, interference signal 103 is an image interference of desired signal 102. Quadrature component 101_Q has a frequency band higher than that of quadrature components 102_Q and 103_Q. Quadrature component 101_Q may be separated by high pass filter, but quadrature component 103_Q can not be separated for having the same frequency band with quadrature component 102_Q.

Figure 1D:
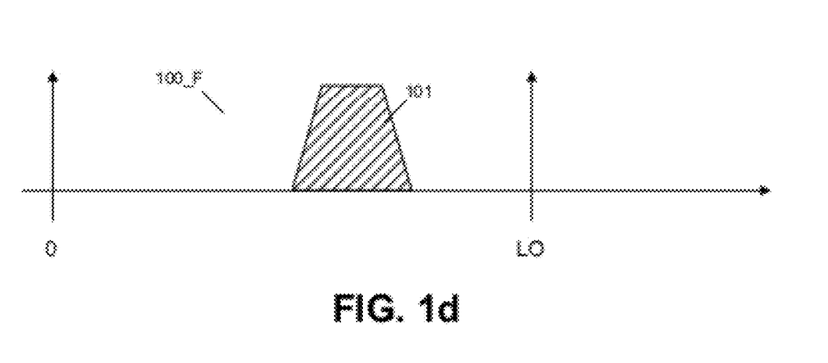
FIG. 1d illustrates a spectrum graph of a separated interference signal obtained by single side band mode.

The separated in-phase components and quadrature components of interference signals may be up-converted using the local oscillator signal to obtain a separated interference signal. FIG. 1d illustrates a spectrum graph of separated interference signal 100_F obtained by high pass filtering in-phase component 100_I and quadrature component 100_Q, and up-converting the separated in-phase component and quadrature component. In this example, because interference signal 103 is an image interference of desired signal 102, it was not separated by the high pass filtering, therefore separated interference signal 100_F only includes interference signal 101. The main path would subtract interference signal 100_F from input signal 100 to obtain an interference removed signal.

Figure 1E:
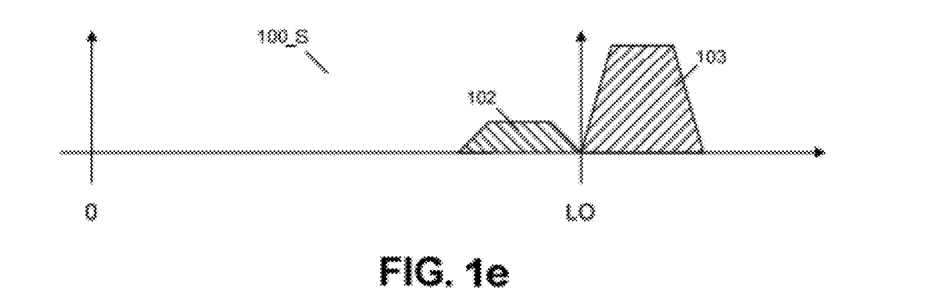
FIG. 1e illustrates a spectrum graph of the input signal illustrated in FIG. 1a subtracted by the separated interference signal illustrated in FIG. 1d.

FIG. 1e illustrates a spectrum graph of interference removed signal 100_S. Since interference signal 103 was not separated, and thereafter it was not subtracted from input signal 100. As a result, interference removed signal 100_S includes not only desired signal 102 but also interference signal 103.

It would be appreciated from the above that if a non-zero IF method is used, in some cases, the approach proposed by Hooman Darabi can not remove interference signals having frequencies close to that of the desired signal, for example, interference signals from channels adjacent to the channel of the desired signal.

Figure 1F:
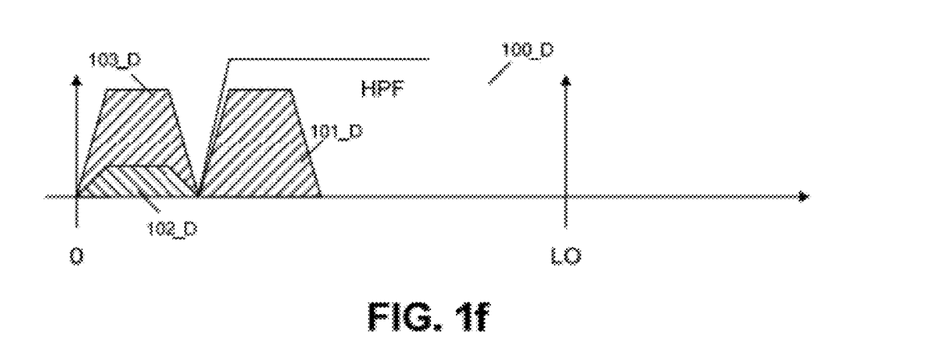
FIG. 1f illustrates a spectrum graph of the input signal illustrated in FIG. 1a down-converted using a low IF method.

FIG. 1f illustrates a spectrum graph of down-converted input signal 100_D using a low IF method, where input signal 100 was down-converted in one channel using double side band mode. Down-converted input signal 100_D includes down-converted desired signal 102_D, down-converted interference signal 103_D having the same frequency band with that of down-converted desired signal 102_D, and down-converted interference signal 101_D having a frequency band higher than that of down-converted desired signal 102_D. Signals having a frequency higher than the frequency band of down-converted desired signal 102_D may be separated by high pass filtering. In this example, only down-converted interference signal 101_D has a frequency band higher than that of down-converted desired signal 102_D, therefore only down-converted interference signal 101_D may be separated by the high pass filtering.

Figure 1G:
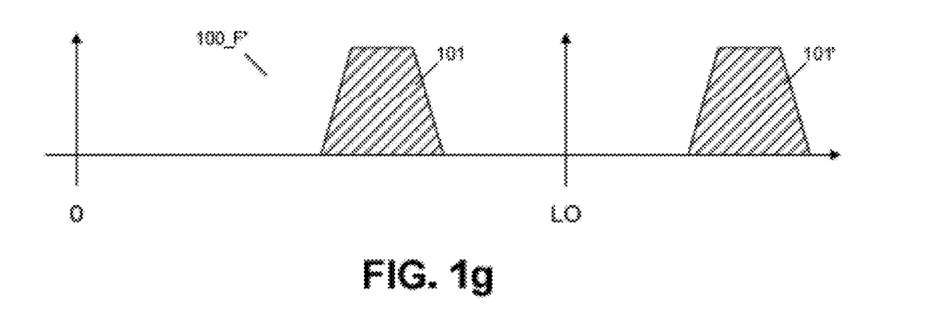
FIG. 1g illustrates a spectrum graph of a separated interference signal obtained by double side band mode.

Referring to FIG. 1g, since double side band mode is used, separated interference signal 100_F', obtained by up converting down-converted interference signal 101_D, includes not only interference signal 101 but also additional interference signal 101'. The frequency band of additional interference signal 101' and the frequency band of interference signal 101 are symmetrical about a vertical axis going through the frequency of the local oscillator signal.

Figure 1H:
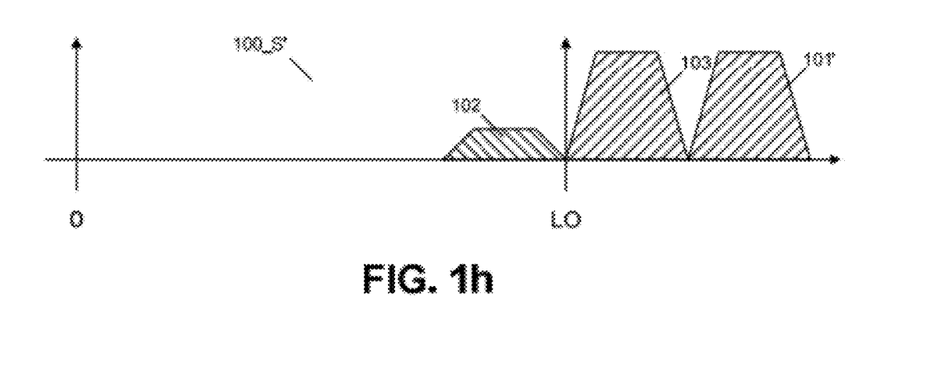
FIG. 1h illustrates a spectrum graph of the input signal illustrated in FIG. 1a subtracted by the separated interference signal illustrated in FIG. 1g.

FIG. 1h illustrates a spectrum graph of an interference removed signal 100_S' obtained by subtracting separated interference signal 100_F' from input signal 100. Because the interference signal 103 was not separated and thereafter it was not removed, and an additional interference signal 101' was generated in the up-conversion, the interference removed signal 100_S' includes not only the interference signal 103 but also the additional interference signal 101'.

It would be appreciated from the above that if the non-zero IF method and the double side band mode are used, in some cases, the approach proposed by Hooman Darabi can not remove interference signals having frequencies close to that of the desired signal, for example, interference signals from channels adjacent to the channel of the desired signal. The desired signal can even get worse that additional interference signals may be generated.

For some applications having high requirement for performance, non-zero IF methods like low IF methods and super-heterodyne methods are preferred. Because of the above mentioned problems, the approach proposed by Hooman Darabi is not suitable for these applications.

Figure 2:
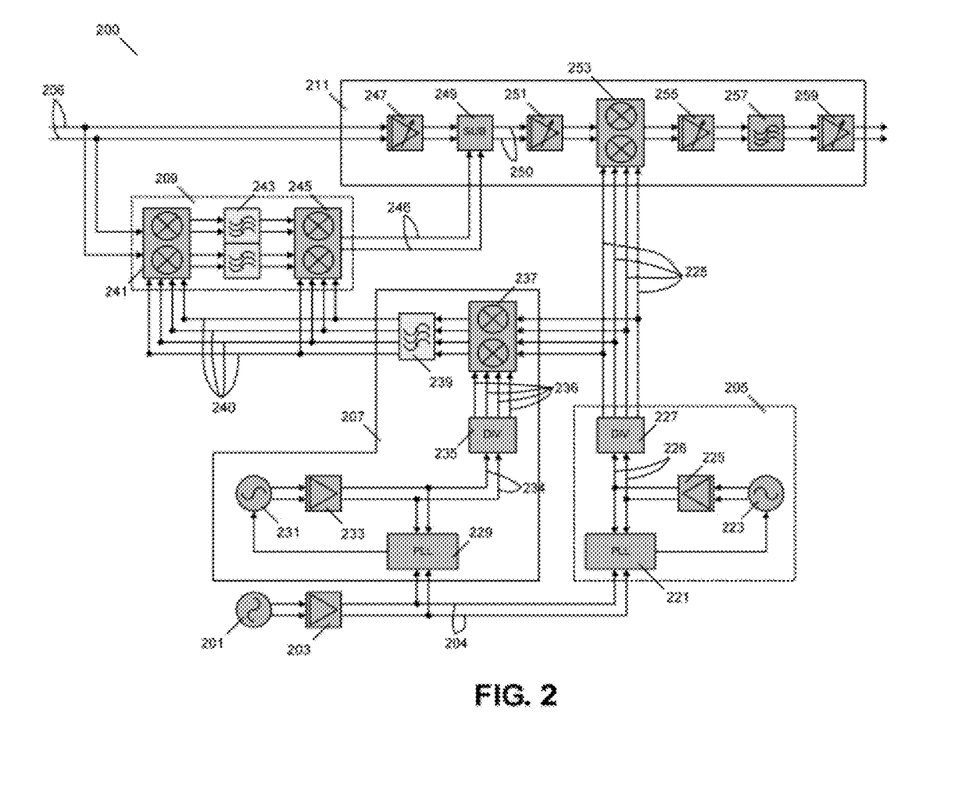
FIG. 2 illustrates a block diagram of a receiver in one embodiment of the present application.

FIG. 2 illustrates a block diagram of receiver 200 in one embodiment of the present application. Receiver 200 includes oscillator 201, amplifier 203, circuit 205 for generating local oscillator signal, circuit 207 for generating offset local oscillator signal, translational path 209, and main path 211. Oscillator 201 is coupled to amplifier 203. Oscillator 201 generates a signal which is a pair of differential signals. The signal is then amplified by amplifier 203 to obtain signal 204 which is also a pair of differential signals.

Circuit 205 generates local oscillator signal 228 using signal 204, and sends local oscillator signal 228 to main path 211. In one embodiment, local oscillator signal 228 includes a pair of differential in-phase component signals and a pair of differential quadrature component signals. Circuit 205 includes phase locked loop (PLL) 221, voltage controlled oscillator (VCO) 223, amplifier 225, and frequency divider 227. One input of PLL 221 is connected with amplifier 203 to receive signal 204, and another input of PLL 221 is connected with the output of amplifier 225. The output of PLL 221 is connected with the input of VCO 223. The input of frequency divider 227 is connected with the output of amplifier 225. The combination of PLL 221, VCO 223, and amplifier 225 may generate signal 226, having a frequency higher than that of signal 204, using signal 204. Frequency divider 227 may generate local oscillator signal 228 having a frequency equal to or lower than that of signal 226.

Circuit 207 generates offset local oscillator signal 240 using signal 204, and sends offset local oscillator signal 240 to translational path 209. In one embodiment, offset local oscillator signal 240 includes a pair of differential in-phase component signals and a pair of differential quadrature component signals. Circuit 207 includes PLL 229, VCO 231, amplifier 233, frequency divider 235, mixing circuit 237, and filter 239. Similar with circuit 205, the combination of PLL 229, VCO 231, and amplifier 233 may generate signal 234 having a frequency higher than that of signal 204, and frequency divider 235 may generate signal 236 having a frequency equal to or lower than that of signal 234.

In one embodiment, signal 236 may include a pair of differential in-phase component signals and a pair of differential quadrature component signals. The frequency of signal 236 equals to the frequency difference between local oscillator signal 228 and the central frequency of the desired signal. Depending on the relationship between local oscillator signal 228 and the desired signal, signal 236 may be positive or negative. Mixing circuit 237 generates a signal, having a frequency equal to the central frequency of the frequency band of the desired signal, using local oscillator signal 228 and signal 236. The signal generated by mixing circuit 237 is then filtered by filter 239 to obtain offset local oscillator signal 240. Since differential signals are utilized, even harmonics can be suppressed or eliminated substantially, therefore filter 239 may be designed to mainly suppress or eliminate odd harmonics. Mixing circuit 237 may include a pair of mixers provided as quadrature mixers.

Translational path 209 may separate some interference signals from input signal 206 to obtain separated interference signal 246 using the zero IF method, and may send separated interference signal 246 to main path 211. Main path 211 may subtract separated interference signal 246 from input signal 206 to obtain interference removed signal 250. Translational path 209 includes mixing circuit 241, high pass filter 243, and mixing circuit 245. Mixing circuit 241 may down-convert input signal 206 using offset local oscillator signal 240. The down-converted signal may be filtered by high pass filter 243. The signal obtained by the filtering may be up-converted using offset local oscillator signal 240 to obtain separated interference signal 246. Separated interference signal 246 may include blocker signals and interference signals from channels adjacent to the channel of the desired signal. Mixing circuits 241 and 245 each may include a pair of mixers provided as quadrature mixers.

Main path 211 includes amplifier 247, subtracting circuit 249, amplifier 251, mixing circuit 253, amplifier 255, filter 257, and amplifier 259. Amplifier 247 may amplify input signal 206, and may send the amplified signal to subtracting circuit 249. Subtracting circuit 249 may subtract separated interference signal 246 from input signal 206 to obtain interference removed signal 250. Interference removed signal 250 may be amplified by amplifier 251 and then sent to mixing circuit 253. Mixing circuit 253 may down-convert interference removed signal 250 to an in-phase component signal and a quadrature component signal using local oscillator signal 228. In one embodiment, image signals may be removed through an image reject filter (not shown) such as poly-phase filter and combination of the in-phase and quadrature components. Since translational path 209 may remove image signals, the image reject filter is optional. It would be appreciated that mixing circuit 253 may output an in-phase and a quadrature component signals, or a single channel signal. The in-phase component signal and the quadrature component signal may be baseband signals, and the single channel signal may be low IF signal. The output signals of the mixing circuit 253 may be further processed by amplifier 255, filter 257, and amplifier 259, and then sent to a demodulator (not shown) for demodulating. Input signal 206 may include the desired signal and one or more interference signals. Mixing circuit 253 may include a pair of mixers provided as quadrature mixers.

In one embodiment, for broadband systems, high pass filter 243 may be replaced by a band pass filter. In one embodiment, the band pass filter may be implemented in a combination of a high pass filter and a low pass filter.

Since translational path 209 utilizes the zero IF method, there is no image interference problem, therefore all blocker signals and interference signals from channels adjacent to the desired signal channel may be removed from input signal 206. In the case that main path 211 utilizes the non-zero IF method, the signal-to-noise ratio of interference removed signal 250 may be improved compared to the approach proposed by Hooman Darabi.

Figure 3A:
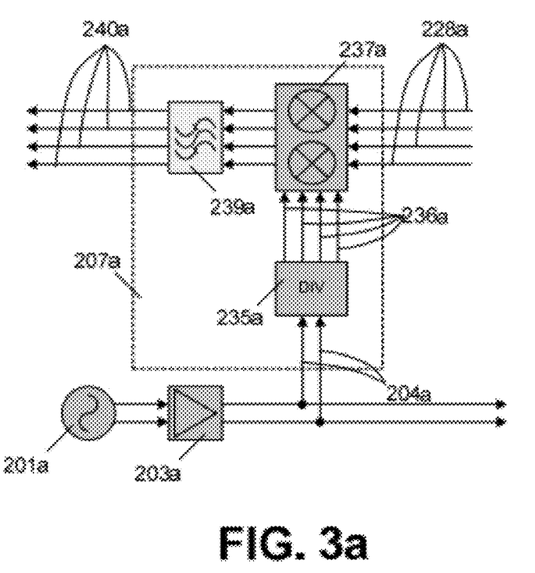
FIG. 3a illustrates a block diagram of an offset local oscillator signal generating circuit in another embodiment of the present application.

FIG. 3a illustrates a block diagram of circuit 207a for generating offset local oscillator signal 240a in one embodiment of the present application. When the difference between the frequency of local oscillator signal 228a and the central frequency of the frequency band of the desired signal is small enough, signal 204a generated by oscillator 201a and amplifier 203a may be used to generate signal 236a directly. Circuit 207a includes frequency divider 235a, mixing circuit 237a, and filter 239a. Frequency divider 235a may generate signal 236a using 204a. Signal 236a may include a pair of differential in-phase component signals and a pair of differential quadrature component signals. The frequency of signal 236a equals to the difference between the frequency of local oscillator signal 228a and the central frequency of the frequency band of the desired signal. Depending on the relationship between the frequency of local oscillator signal 228a and the central frequency of the frequency band of the desired signal, the frequency of signal 236a can be positive or negative. Local oscillator signal 228a and signal 236a may be mixed by mixing circuit 237a, and then the obtained signal may be filtered by filter 239a to eliminate or suppress odd harmonics to obtain offset local oscillator signal 240a. Mixing circuit 237a may include a pair of mixers provided as quadrature mixers.

Figure 3B:
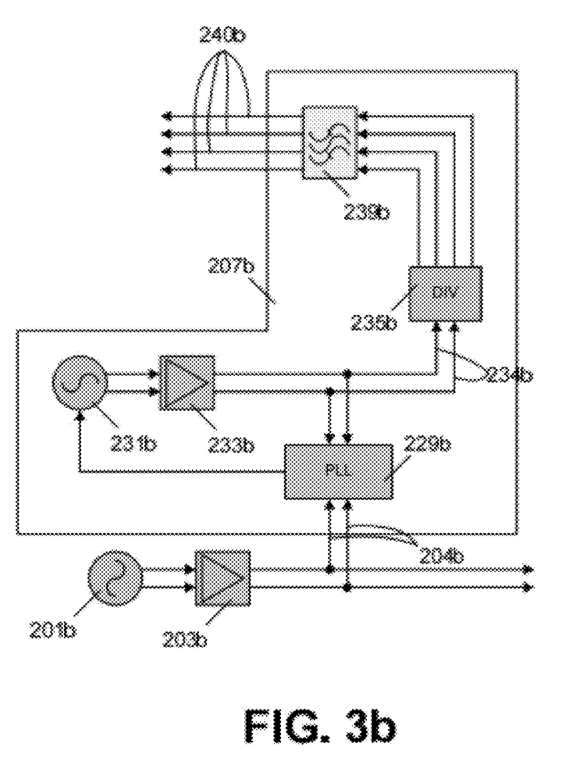
FIG. 3b illustrates a block diagram of an offset local oscillator signal generating circuit in another embodiment of the present application.

FIG. 3b illustrates a block diagram of circuit 207b for generating offset local oscillator signal 240b in one embodiment of the present application. In this embodiment, offset local oscillator signal 240b may be generated without using local oscillator signal. Circuit 207b includes PLL 229b, VCO 231b, amplifier 233b, frequency divider 235b, and filter 239b. The combination of PLL 229b, VCO 231b, and amplifier 233b may generate signal 234b, having a frequency higher than that of signal 204b, using signal 204b generated by oscillator 201b and amplifier 203b. Frequency divider 235b may generate a signal, having a frequency equal to the central frequency of the desired signal, using signal 234b. Then the signal generated by frequency divider 235b may be filtered by filter 239b to obtain offset local oscillator signal 240b. Offset local oscillator signal 240b may include a pair of differential in-phase component signals and a pair of differential quadrature component signals.

In one embodiment, offset local oscillator signal and local oscillator signal may both be generated using a signal generated by a same reference oscillator, to obtain a good synchronization.

Figure 4A:
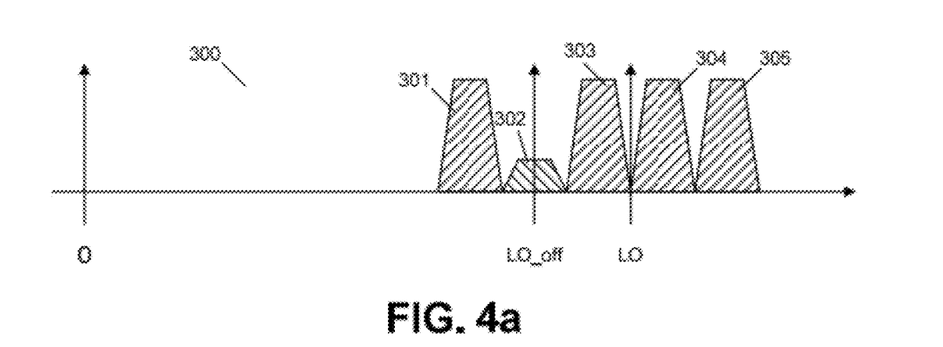
FIG. 4a illustrates a spectrum graph of an input signal in another example.

FIG. 4a illustrates a spectrum graph of input signal 300. Input signal 300 includes interference signal 301 from n−1$^{th}$ channel, desired signal 302 transmitted in n$^{th}$ channel, interference signal 303 from n+1$^{th}$ channel, interference signal 304 from n+2$^{th}$ channel, and interference signal 305 from n+3$^{th}$ channel. Interference signals 301, 303, 304, and 305 each has amplitudes higher than that of desired signal 302. Channels n−1 to n+3 have a same frequency bandwidth. In one embodiment, the main path uses the low IF method, and the frequency bands of interference signal 303 and interference signal 304 are symmetrical about a vertical axis going through the frequency of the local oscillator signal (LO). The translational path uses the zero IF method, and the frequency of the offset local oscillator signal substantially equals to the central frequency of desired signal 302. The frequency bands of interference signal 301 and interference signal 303 are symmetrical about a vertical axis going through the frequency of the offset local oscillator signal (LO_off).

Figure 4B:
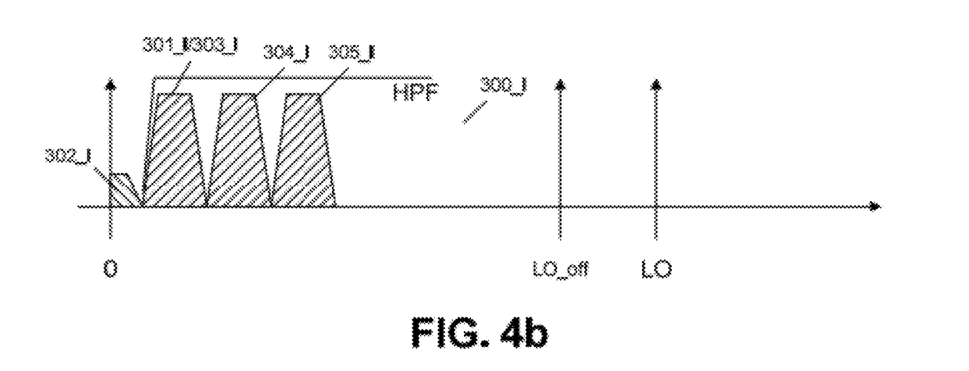
FIG. 4b illustrates a spectrum graph of an in-phase component of the input signal illustrated in FIG. 4a, down-converted using a low IF method.

FIG. 4b illustrates a spectrum graph of in-phase component signal 300_I of input signal 300 down-converted using the zero IF method. In-phase component signal 300_I includes in-phase component signal 301_I of interference signal 301, in-phase component signal 302_I of desired signal 302, in-phase component signal 303_I of interference signal 303, in-phase component signal 304_I of interference signal 304, and in-phase component signal 305_I of interference signal 305. Because the frequency bands of interference signal 301 and interference signal 303 are symmetrical about a vertical axis going through the frequency of the offset local oscillator signal, in-phase component signal 301_I and in-phase component signal 303_I have the same frequency band, or overlap each other. The frequency bands of in-phase component signals 301_I, 303_I, 304_I, and 305_I of the interference signals are all higher than that of in-phase component signal 302_I of desired signal 302, as illustrated in FIG. 4b. All signals, having a frequency higher than the frequency band of in-phase component signal 302_I of desired signal 302, may be separated out using a high pass filter. In one example, in-phase component signals 301_I, 303_I, 304_I, and 305_I were separated.

Figure 4C:
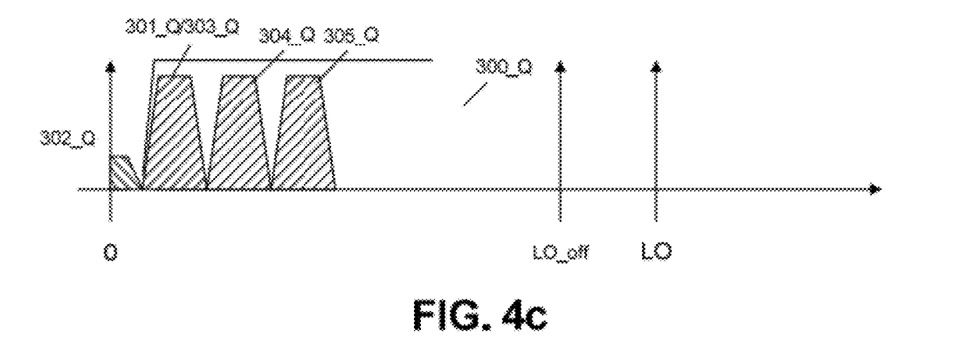
FIG. 4c illustrates a spectrum graph of a quadrature component of the input signal illustrated in FIG. 4a, down-converted using the low IF method.

FIG. 4c illustrates a spectrum graph of quadrature component signal 300_Q of input signal 300 down-converted using the zero IF method. Quadrature component signal 300_Q includes quadrature component signal 301_Q of interference signal 301, quadrature component signal 302_Q of desired signal 302, quadrature component signal 303_Q of interference signal 303, quadrature component signal 304_Q of interference signal 304, and quadrature component signal 305_Q of interference signal 305. Because the frequency bands of interference signal 301 and interference signal 303 are symmetrical about a vertical axis going through the frequency of the offset local oscillator signal, quadrature component signal 301_Q and quadrature component signal 303_Q have the same frequency band, or overlap each other. The frequency bands of quadrature component signals 301_Q, 303_Q, 304_Q, and 305_Q of the interference signals are all higher than that of quadrature component signal 302_Q of desired signal 302, as illustrated in FIG. 4c. All signals, having a frequency higher than the frequency band of quadrature component signal 302_Q of desired signal 302, may be separated using a high pass filter. In one example, quadrature component signals 301_Q, 303_Q, 304_Q, and 305_Q were separated.

Figure 4D:
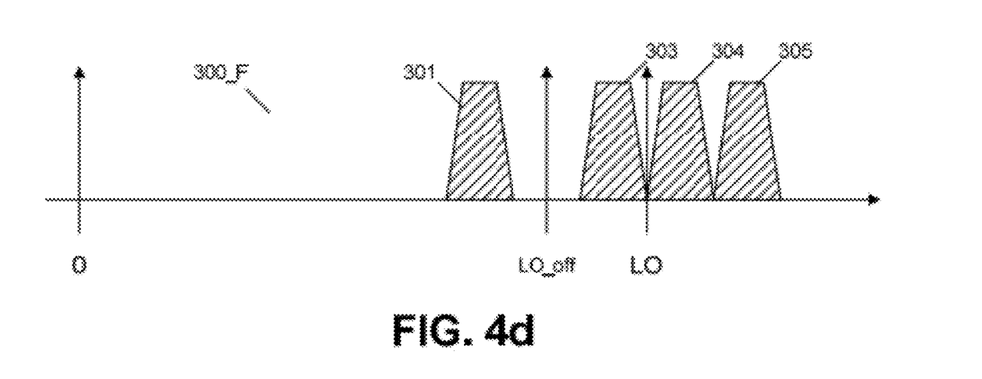
FIG. 4d illustrates a spectrum graph of a separated interference signal obtained by single side band mode.

The separated in-phase component signals and quadrature component signals of the interference signals may be up-converted back to obtain a separated interference signal. FIG. 4d illustrates a spectrum graph of separated interference signal 300_F obtained by up-converting in-phase component signals 301_I, 303_I, 304_I, and 305_I, and quadrature component signals 301_Q, 303_Q, 304_Q, and 305_Q back to the frequency range within which input signal 300 locates. Since the zero IF method is used, there is no image interference, such that interference signals 301, 303, 304, and 305 were all separated. As a result, separated interference signal 300_F includes interference signals 301, 303, 304, and 305. The main path may subtract separated interference signal 300_F from input signal 300 to obtain an interference removed signal.

Figure 4E:
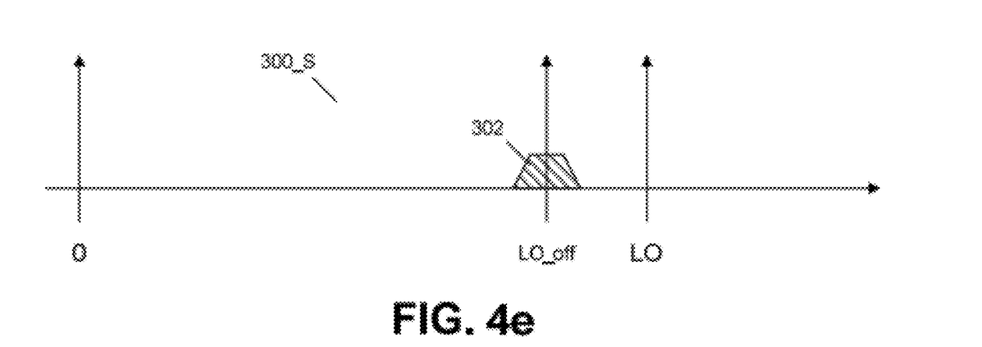
FIG. 4e illustrates a spectrum graph of the input signal illustrated in FIG. 4a subtracted by the separated interference signal illustrated in FIG. 4d.

FIG. 4e illustrates a spectrum graph of interference removed signal 300_S obtained by subtracting separated interference signal 300_F from input signal 300. Since interference signals 301, 303, 304, and 305 were all separated, interference removed signal 300_S substantially does not include any part of the interference signals.

Figure 4F:
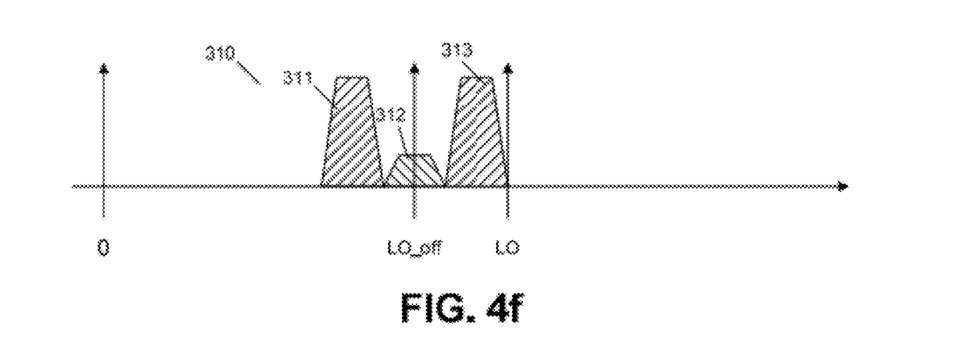
FIG. 4f illustrates a spectrum graph of an input signal in another example.

FIG. 4f illustrates a spectrum graph of an input signal 310. Input signal 310 includes an interference signal 311 from n−1$^{th}$ channel, a desired signal 312 transmitted in n$^{th}$ channel, and an interference signal 313 from n+1$^{th}$ channel. Interference signals 311 and 313 each has an amplitude higher than that of desired signal 312. Channels n−1 to n+1 have a same frequency bandwidth. In one embodiment, the main path uses a low IF method, and the frequency of the local oscillator signal (LO) equals to the highest frequency of the frequency band of interference signal 313. The translational path uses a zero IF method, and the frequency of the offset local oscillator signal substantially equals to the central frequency of desired signal 312. The frequency bands of interference signal 311 and interference signal 313 are symmetrical about a vertical axis going through the frequency of the offset local oscillator signal (LO_off).

In a mixing e.g. a down-conversion, a first group and a second group of signals will be generated, where the first group of signals is obtained by frequency shifting input signal 310 toward left by the frequency of the offset local oscillator signal, the second group of signals is obtained by frequency shifting input signal 310 toward right by the frequency of the offset local oscillator signal. In other words, the frequency of the first group of signals equals the frequency of input signal 312 minus the frequency of the offset local oscillator signal, and the frequency of the second group of signals equals the frequency of input signal 312 plus the frequency of the offset local oscillator signal. For narrow band systems, the second group of signals is invisible, or will be attenuated by the system, but for broad band systems, the second group of signals is visible, or is included in the down-converted signal.

Therefore, for broad band systems, the separated interference signal includes not only the interference signals 311 and 313 but also a signal obtained by frequency shifting the input signal toward right by the frequency of the offset local oscillator signal, if only using high pass filter. In this situation, a band pass filter is necessary.

Figure 4G:
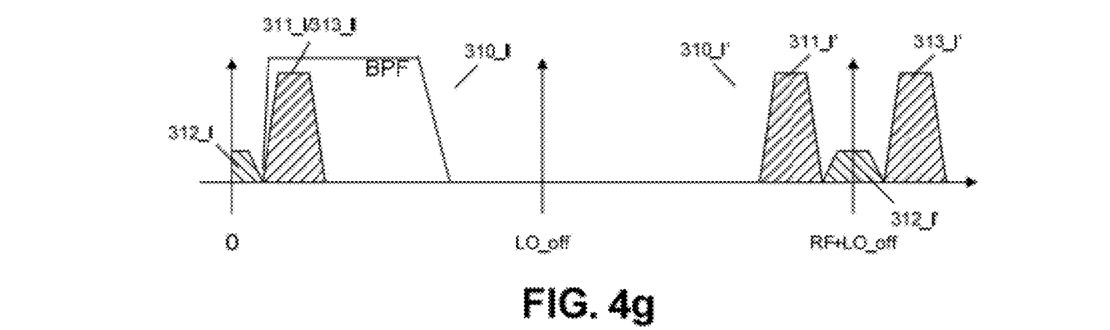
FIG. 4g illustrates a spectrum graph of an in-phase component signal of the input signal illustrated in FIG. 4f down-converted using a zero IF method in a broad band system.

FIG. 4g illustrates a spectrum graph of in-phase component signals 310_I and 310_I' of input signal 310 down-converted using a zero IF method. The frequency of in-phase component signal 310_I equals the frequency of input signal 312 minus the frequency of the offset local oscillator signal. In-phase component signal 310_I includes in-phase component signal 311_I of interference signal 311, in-phase component signal 312_I of desired signal 312, and in-phase component signal 313_I of interference signal 313. Because the frequency bands of interference signal 311 and interference signal 313 are symmetrical about a vertical axis going through the frequency of the offset local oscillator signal, in-phase component signal 311_I and in-phase component signal 313_I have the same frequency band, or overlap each other. The frequency bands of in-phase component signals 311_I and 313_I of the interference signals are all higher than that of in-phase component signal 312_I of desired signal 312, as illustrated in FIG. 4g. The frequency of in-phase component signal 310_I' equals the frequency of input signal 310 plus the frequency of the offset local oscillator signal. In-phase component signal 310_I' includes in-phase component signal 311_I' of interference signal 311, in-phase component signal 312_I' of desired signal 312, and in-phase component signal 313_I' of interference signal 313. Using a band pass filter, only signals having a frequency higher than the frequency band of in-phase component signal 312_I of desired signal 312, and lower than the lowest frequency of the in-phase component signal 310_I', will be separated. In another embodiment, the band pass filter may be implemented in a combination of a high pass filter and a low pass filter. The corner frequency of the low pass filter may be set between the highest frequency of signal 310_I and the lowest frequency of signal 310_I'. In other words, only in-phase component signal 311_I and 313_I are separated.

Figure 4H:
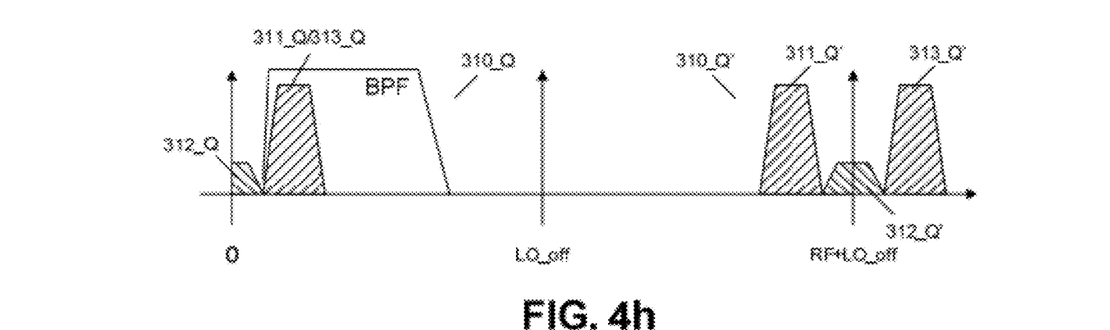
FIG. 4h illustrates a spectrum graph of a quadrature component signal of the input signal illustrated in FIG. 4f down-converted using a zero IF method in a broad band system.

FIG. 4h illustrates a spectrum graph of quadrature component signals 310_Q and 310_Q' of input signal 310 down-converted using the zero IF method. The frequency of quadrature component signal 310_Q equals the frequency of input signal 312 minus the frequency of the offset local oscillator signal. Quadrature component signal 310_Q includes quadrature component signal 311_Q of interference signal 311, quadrature component signal 312_Q of desired signal 312, and quadrature component signal 313_Q of interference signal 313. Because the frequency bands of interference signal 311 and interference signal 313 are symmetrical about a vertical axis going through the frequency of the offset local oscillator signal, quadrature component signal 311_Q and quadrature component signal 313_Q have the same frequency band, or overlap each other. The frequency bands of quadrature component signals 311_Q and 313_Q of the interference signals are all higher than that of quadrature component signal 312_Q of desired signal 312, as illustrated in FIG. 4h. The frequency of quadrature component signal 310_Q' equals the frequency of input signal 312 plus the frequency of the offset local oscillator signal. Quadrature component signal 310_Q' includes quadrature component signal 311_Q' of interference signal 311, quadrature component signal 312_Q' of desired signal 312, and quadrature component signal 313_Q' of interference signal 313. Using a band pass filter, only signals having a frequency higher than the frequency band of quadrature component signal 312_Q of desired signal 312, and lower than the lowest frequency of the quadrature component signal 310_Q % will be separated. In other words, only quadrature component signals 311_Q and 313_Q are separated.

Figure 4I:
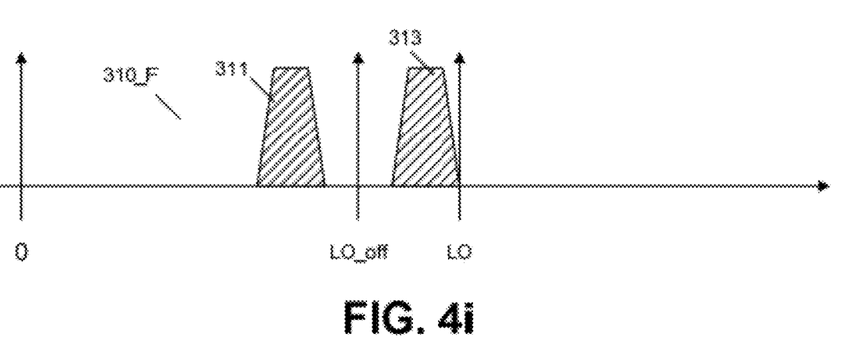
FIG. 4i illustrates a spectrum graph of a separated interference signal obtained by single side band mode.

The separated in-phase component signals and quadrature component signals of the interference signals may be up-converted back to obtain a separated interference signal. FIG. 4i illustrates a spectrum graph of separated interference signal 310_F obtained by up-converting in-phase component signals 311_I and 313_I, and quadrature component signals 311_Q and 313_Q back to the frequency range within which input signal 310 locates. As a result, separated interference signal 300_F substantially only includes interference signals 311 and 313. The main path may subtract separated interference signal 300_F from input signal 300 to obtain an interference removed signal.

Figure 4J:
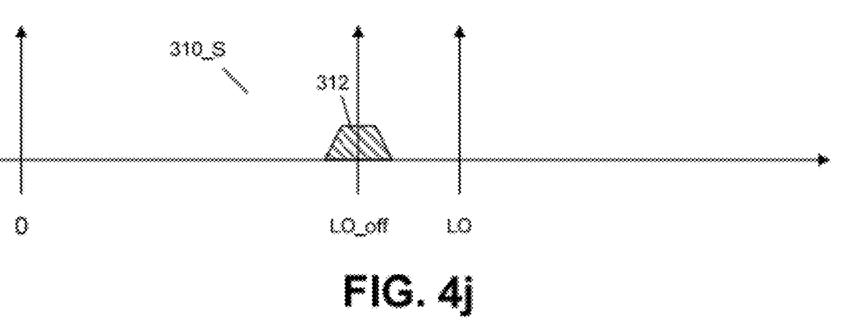
FIG. 4j illustrates a spectrum graph of the input signal illustrated in FIG. 4f subtracted by the separated interference signal illustrated in FIG. 4i.

FIG. 4j illustrates a spectrum graph of interference removed signal 310_S obtained by subtracting separated interference signal 310_F from input signal 310. Since interference signals 311 and 313 were all separated, interference removed signal 310_S substantially does not include any part of the interference signals.

It would be appreciated that if the translational path uses a zero IF method and the main path uses a low IF method, the performance of the receiver can be further improved compared with the approach proposed by Hooman Darabi.

Figure 5:
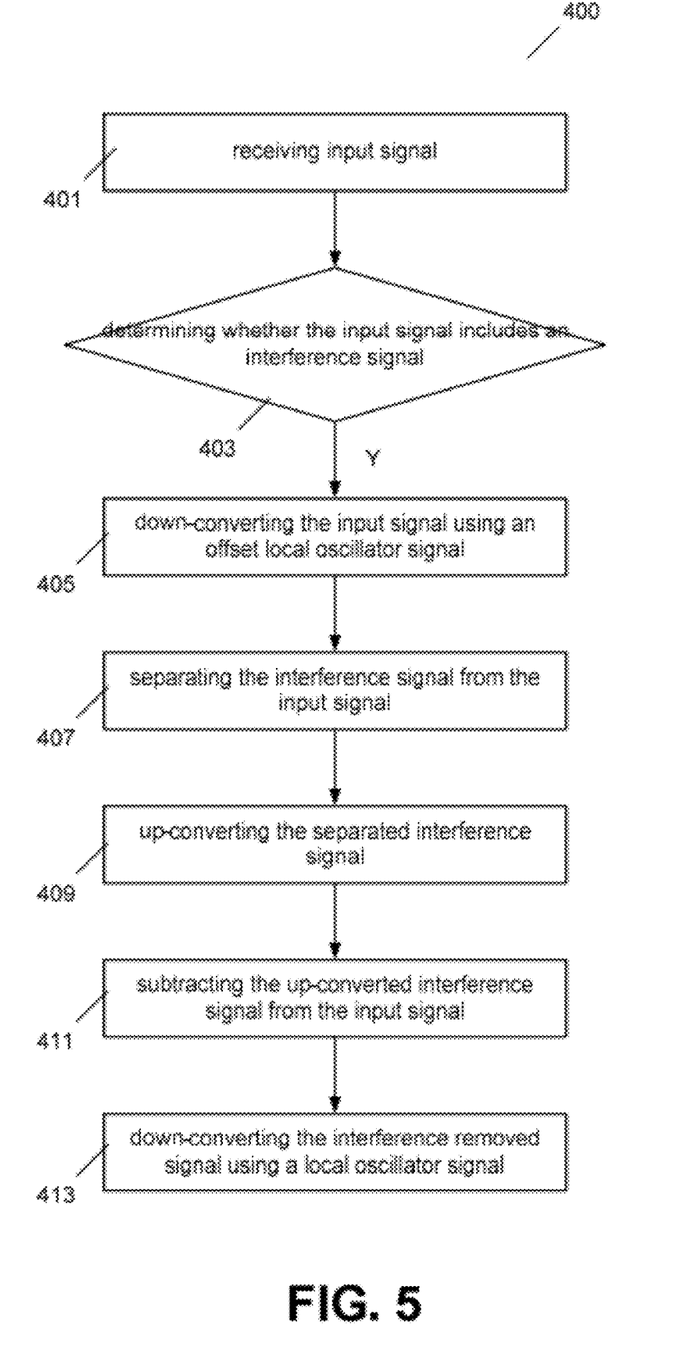
FIG. 5 illustrates a flowchart of a signal processing method in one embodiment of the present application.

FIG. 5 illustrates a flowchart of a signal processing method 400 in a receiver in one embodiment of the present application. At 401, an input signal within a first frequency range, for example RF, is received. The input signal may include a desired signal and an interference signal. The interference signal may be from a channel adjacent to the desired signal.

At 403, it is determined whether the input signal includes an interference signal. It will be appreciated that 403 is optional. A detector e.g. a power detector may be provided to detect whether the input signal includes an interference signal. The power detector may, for example, detect presence of an interference signal by detecting a power or amplitude of the input signal that may be significantly greater than the expected amplitude or power of the desired signal.

At 405, the input signal is down-converted to a second frequency range, for example IF, using an offset local oscillator signal. The second frequency range is lower than the first frequency. The frequency of the offset local oscillator signal substantially equals to the central frequency of the desired signal. In other words, the input signal is down-converted to the second frequency range using a zero IF method.

At 407, the interference signal is separated. In one embodiment, the interference signal may be separated using a high pass filter.

At 409, the separated interference signal is up-converted to the first frequency range.

At 411, the up-converted interference signal is subtracted from the input signal to obtain an interference removed signal.

At 413, the interference removed signal is down-converted to a third frequency range, for example IF, using a local oscillator signal, and then it is filtered, amplified, and demodulated. The third frequency range is lower than the first frequency range. The frequency of the local oscillator signal is different from that of the offset local oscillator signal. In other words, the interference removed signal is down-converted using a non-zero IF method e.g. a low IF method.

Method 400 may further include an operation for generating the local oscillator signal and an operation for generating the offset local oscillator signal. In the operation for generating the offset local oscillator signal, the offset local oscillator signal is generated by mixing the local oscillator signal and a signal having a frequency equal to the difference between the frequency of the local oscillator signal and the central frequency of the desired signal.

The methods and apparatuses provided by the present applications may be used in mobile communication systems e.g. a cell phone, FM systems e.g. FM radio, two way radio systems, a satellite Set Top Box (STB), and a cable STB etc.

I claim:

1. A signal processing method for a receiver comprising:
    receiving an input signal within a first frequency range, the input signal including a desired signal and an interference signal;
    down-converting the input signal to a second frequency range using an offset local oscillator signal having a frequency substantially equal to a central frequency of the desired signal, wherein the second frequency range is lower than the first frequency range;
    separating the interference signal from the down-converted input signal;
    up-converting the separated interference signal to the first frequency range;
    subtracting the up-converted interference signal from the input signal at the first frequency range to obtain an interference removed signal; and
    down-converting the interference removed signal to a third frequency range for demodulating using a local oscillator signal, wherein the third frequency range is lower than the first frequency range and the frequency of the offset local oscillator signal is different from a frequency of the local oscillator signal.

2. The signal processing method of claim 1, wherein the first frequency range is an RF frequency range, and the second frequency range and the third frequency range are IF frequency ranges.

3. The signal processing method of claim 1, wherein the interference signal is from a channel adjacent to the desired signal.

4. The signal processing method of claim 1 further comprising:
    phase shifting the up-converted interference signal by 180 degrees; and
    adding the phase shifted interference signal to the input signal at the first frequency range to obtain the interference removed signal.

5. The signal processing method of claim 1 further comprising:
    mixing the local oscillator signal and a signal having a frequency equal to the difference between the frequency of the local oscillator signal and the central frequency of the desired signal, to generate the offset local oscillator signal.

6. A signal processing method comprising:
    receiving an input signal within a first frequency range, the input signal including a desired signal and an interference signal;
    down-converting the input signal to a second frequency range using a zero IF method, wherein the second frequency range is lower than the first frequency range;
    separating the interference signal from the down-converted input signal;
    up-converting the separated interference signal to the first frequency range;
    subtracting the up-converted interference signal from the input signal at the first frequency range to obtain an interference removed signal; and
    down-converting the interference removed signal to a third frequency range for demodulating using a non-zero IF method, wherein the third frequency range is lower than the first frequency range.

7. The signal processing method of claim 6, wherein the first frequency range is an RF frequency range, and the second frequency range and the third frequency range are IF frequency ranges.

8. The signal processing method of claim 6, wherein the interference signal is from a channel adjacent to the desired signal.

9. The signal processing method of claim 6 further comprising:
    phase shifting the up-converted interference signal by 180 degrees; and
    adding the phase shifted interference signal to the input signal at the first frequency range to obtain the interference removed signal.

10. The signal processing method of claim 6, wherein the non-zero IF method is selected from a group comprised of low IF methods and high IF methods.

11. A receiver comprising:
    a first mixing circuit for down-converting an input signal within a first frequency range to a second frequency range using a zero IF method, wherein the second frequency range is lower than the first frequency range, and the input signal includes a desired signal and an interference signal;
    a filter for separating the interference signal from the down-converted input signal;
    a second mixing circuit for up-converting the separated interference signal to the first frequency range;
    a subtracting circuit for subtracting the up-converted interference signal from the input signal at the first frequency range to obtain an interference removed signal; and
    a third mixing circuit for down-converting the interference removed signal to a third frequency range for demodulating using a non-zero IF method, wherein the third frequency range is lower than the first frequency range.

12. The receiver of claim 11, wherein the filter is selected from a high pass filter and a band pass filter.

13. The receiver of claim 11, wherein the first frequency range is an RF frequency range, and the second frequency range and the third frequency range are IF frequency ranges.

14. The receiver of claim 11, wherein the interference signal is an interference signal from a channel adjacent to the desired signal.

15. The receiver of claim 11 further comprising:
    a local oscillator signal source for providing a local oscillator signal to the third mixing circuit for down-converting the interference removed signal to the third frequency range; and
    an offset local oscillator signal source for providing an offset local oscillator signal to the first mixing circuit for down-converting the input signal to the second frequency range.

16. The receiver of claim 15, wherein the offset local oscillator signal source comprises a fourth mixing circuit for mixing the local oscillator signal with a signal having a frequency equal to the difference between the frequency of the local oscillator signal and the central frequency of the desired signal, to obtain the offset local oscillator signal.

17. The receiver of claim 16, wherein the fourth mixing circuit comprises a pair of mixers provided as quadrature mixers.

18. The receiver of claim 11, wherein the first mixing circuit comprises a first pair of mixers provided as quadrature mixers, and the second mixing circuit comprises a second pair of mixers provided as quadrature mixers.

19. The receiver of claim 11, wherein the third mixing circuit comprises a third pair of mixers provided as quadrature mixers.

20. The receiver of claim 11, wherein non-zero IF method is selected from a group comprised of low IF methods and high IF methods.

* * * * *